United States Patent [19]
Haisma et al.

[11] Patent Number: 5,483,115
[45] Date of Patent: Jan. 9, 1996

[54] ELECTRICAL MACHINE WITH DIRECTLY BONDED MAGNETIC PARTS

[75] Inventors: Jan Haisma; Evert M. H. Kamerbeek; Gijsbertus A. C. M. Spierings; Peter W. De Haas, all of Eindhoven, Netherlands

[73] Assignee: U.S. Philips Corporation, New York, N.Y.

[21] Appl. No.: 284,714

[22] Filed: Aug. 2, 1994

Related U.S. Application Data

[63] Continuation of Ser. No. 25,692, Mar. 3, 1993, abandoned.

[30] Foreign Application Priority Data

Mar. 20, 1992 [NL] Netherlands ............... 9200515

[51] Int. Cl.⁶ .................. H02K 21/12; H02K 21/26
[52] U.S. Cl. ............................... 310/156; 310/154
[58] Field of Search ................. 310/26, 68 R, 310/154, 156, 254, 261, 40 R, 42, 46, 48, 67 R, 267, 40 MM; 228/120, 193

[56] References Cited

U.S. PATENT DOCUMENTS

| | | | |
|---|---|---|---|
| 3,280,353 | 10/1966 | Haydon et al. | 310/154 |
| 4,724,368 | 2/1988 | Andrews | 318/439 |
| 4,779,165 | 10/1988 | Elgaesser et al. | 310/156 |
| 5,175,461 | 12/1992 | Zigler et al. | 310/156 |
| 5,184,040 | 2/1993 | Lim | 310/156 |
| 5,189,572 | 2/1993 | Gooch | 360/77.12 |
| 5,193,266 | 3/1993 | Caputo | 310/156 |
| 5,337,030 | 8/1994 | Mohler | 310/156 |
| 5,353,491 | 10/1994 | Gentry et al. | 310/154 |
| 5,402,025 | 3/1995 | Saito et al. | 310/156 |

FOREIGN PATENT DOCUMENTS

| | | |
|---|---|---|
| 0180753 | 5/1986 | European Pat. Off. . |
| 2839353 | 2/1980 | Germany . |
| 3236954 | 4/1984 | Germany . |
| 57-85560 | 5/1982 | Japan . |
| 1132949 | 11/1968 | United Kingdom . |

OTHER PUBLICATIONS

Japanese Journal of Applied Physics, vol. 28, No. 8, Aug. 1989, pp. 1426–1443.

Primary Examiner—Matthew V. Nguyen
Attorney, Agent, or Firm—Laurie E. Gathman

[57] ABSTRACT

An electrical machine comprises a stationary first section (1) and a second section (5) which is movable relative to the stationary section. At least one of the sections comprises a soft-magnetic part (7) and a hard-magnetic part (9). A surface (7a) of the soft-magnetic part and a surface (9a) of the hard-magnetic part are fixed intimately to one another by direct bonding.

21 Claims, 2 Drawing Sheets

ELECTRICAL MACHINE WITH DIRECTLY BONDED MAGNETIC PARTS

This is a continuation of application Ser. No. 08/025,692, filed Mar. 3, 1993 now abandoned.

FIELD OF THE INVENTION

The invention relates to an electrical machine comprising a stationary first section and a second section which is movable relative to the stationary section, at least one of said sections comprising a soft-magnetic part and a hard-magnetic part, which parts are interconnected.

BACKGROUND OF THE INVENTION

Such a machine is known from EP-A-0,180,753 (herewith incorporated by reference). The known machine, constructed as an electric motor with an air gap, comprises a disc-shaped rotor section fixed to a rotor shaft and a stator section facing the rotor section, the air gap extending between the rotor section and the stator section. The stator section and the rotor section together form a magnetic circuit. The stator section has a soft-magnetic part serving as a magnetic yoke and a multi-pole permanent-magnetic or hard-magnetic part adjoining the air gap and fixed to the soft-magnetic part by of an adhesive layer.

A drawback of the known electrical machine is the presence of a comparatively large gap, formed by the adhesive layer, between the soft-magnetic part and the hard-magnetic part of the stator section. This results in substantial magnetic transition resistances in the magnetic circuit at the crossings from one magnetic part to the other magnetic part, leading to reduced efficiency and output. Particularly in the case of electric motors of small dimensions such transition resistances may have a substantial adverse effect on the motor characteristics.

SUMMARY OF THE INVENTION

It is an object of the invention to provide an electrical machine in which a pair of hard-magnetic and soft-magnetic parts are fixed intimately to one another without producing or producing only minimal magnetic transition resistance.

To this end the electrical machine in accordance with the invention is characterized in that a surface of the soft-magnetic part and a surface of the hard-magnetic part are fixed intimately to one another by direct bonding.

As used herein, "direct bonding" to be understood to mean a process in which facing surfaces of two bodies to be interconnected are mechanically finished in such a manner and are subsequently brought into such intimate contact with one another that a spontaneous bond is formed based at least on Van der Waals' forces. Direct bond as used herein is defined as the bond between two substrates brought about by attractive interfacial forces between opposing, facing surfaces of the substrates in intimate contact with each other. These forces include attractive Van der Waals forces wherein the mutual electrical interaction between the electrons and nuclei of one atom or molecule with those of another causes a dispersion force for a pair of atoms or molecules. In the case of magnetic material, magnetic forces also play a role in direct bonding.

In the electrical machine in accordance with the invention the direct bonded surfaces of the magnetic parts are spaced apart at atomic distances and may be provided with an adsorbed monolayer of hydroxyl groups. Surprisingly, this means that, although there is a material interface between the hard-magnetic and the soft-magnetic part, there is no or only a negligible spacing between the two materials. An advantage of this is that a magnetic flux experiences no, or hardly, any demagnetizing resistance in crossing from the hard-magnetic part to the soft-magnetic part or vice versa, which works out very favorably for the machine characteristics.

The electrical machine in accordance with the invention is very suitable for use as a small electric motor, for example with a diameter of approximately 10 mm and a height of approximately 5 mm. Such small electric motors are suitable for use in, for example, audio, video or data equipment.

It is to be noted that Van der Waals' bonding has been known for a considerable time. This Van der Waals' bonding is used in methods of manufacturing single-crystal layers on an insulator, specifically the SOI method (Silicon-on-Insulator). For more information on these methods reference is made to the Japanese Journal of Applied Physics, Vol. 28, No. 8, August 1989, pp. 1426–1443 (herewith incorporated by reference). The known use of Van der Waals' bonding however, relates to materials not having a magnetic moment, in other words not having hard-magnetic or soft-magnetic properties.

In the electrical machine in accordance with the invention, materials, including a hard-magnetic material, are connected to one another by direct bonding. In principle, magnetic materials can be divided into two groups: ferromagnetic materials and ferrimagnetic materials. As is known, magnetism is produced by a system of magnetic dipole moments within an energetically defined volume in a crystal lattice. A resulting magnetic moment is then formed by the sum of the magnetic dipole moments of a plurality of magnetic domains which are energetically and crystallographically defined by the material structure. In ferromagnetic materials the available magnetic moments in a domain are aligned in the same direction. In ferrimagnetic materials the individual magnetic dipole moments in a domain are orientated oppositely but are of unequal magnitude. The soft-magnetic materials exhibit an easy to induce magnetic moment and the hard-magnetic or permanent magnetic materials exhibit a permanent magnetic moment after magnetization.

In an embodiment of an electrical machine in accordance with the invention, a second section is constructed as a rotor rotatable about an axis of rotation and forms an air gap with the first section. The bonded surfaces of the soft-magnetic and hard-magnetic disc-shaped parts extend in a plane oriented transversely of the rotor axis. Such an electrical machine is very suitable for use as an axial-field motor.

A practical embodiment, which is particularly suitable as a small electrical machine, in which one of the sections comprises the soft-magnetic part and the hard-magnetic part, and the other section comprises at least one coil, is characterized in that the coil is embedded in a non-magnetic support having a main surface adjoining the air gap.

An embodiment of the electrical machine in accordance with the invention is characterized in that parallel to said main surface the support has a further main surface adjoining a further axial air gap formed between the first section and the second section, the support, which extends between the two air gaps, being circumferentially surrounded by a magnetic flux guide which extends axially between and is connected to the hard-magnetic part facing one of said main surfaces of the support and a further soft-magnetic part facing the other main surface of the support.

In the embodiment described in the last paragraph one of the parts, preferably the stationary part, comprises only the support with the coil or coils, and the other part comprises all the hard-magnetic and soft-magnetic materials. Preferably, the various magnetic components constituted by the flux guide and the soft-magnetic and hard-magnetic parts are fixed intimately to one another by direct bonding, so as to form a magnetic circuit in which no or only small losses of magnetomotive force occur at the material interfaces.

A modification of the last-mentioned embodiment is characterized by the presence of a further support which extends parallel to said support and which comprises at least one coil, the hard-magnetic part extending between the two supports and forming an air gap with each of the supports, while one of the supports forms an air gap with the soft-magnetic part and the further support forming an air gap with a further soft-magnetic part parallel to said soft-magnetic part, both supports being circumferentially surrounded by magnetic flux guides which each extend between the hard-magnetic part connected to the relevant flux guide and one of said soft-magnetic parts which is connected to the relevant flux guide. For a further improvement of the power of the electrical machine the flux guide is or the flux guides are permanently magnetized. Moreover, the flux guide is or the flux guides are fixed intimately to a hard-magnetic and/or soft-magnetic part by direct bonding.

The invention further relates to an electrical machine comprising a stationary first section and a second section which is movable relative to the stationary section, which machine is characterized in that at least one of said sections comprises two hard-magnetic parts, a surface of one hard-magnetic part being fixed intimately to a surface of the other hard-magnetic part by direct bonding. This electrical machine in accordance with the invention mitigates the occurrence of loss of magnetomotive force at the interface between two hard-magnetic materials.

An embodiment of the electrical machine in accordance with the invention is characterized in that the hard-magnetic part is or the soft-magnetic parts are made of a hard-magnetic material of a set comprising hard-magnetic intermetallic compounds and hard-magnetic hexagonal ferrites. Suitable intermetallic compounds are, for example, $SmCo_5$, $Sm_2Co_{17}$ and $Nd_2Fe_{14}B$. Suitable hexagonal ferrites are, for example, $BaFe_{12}O_{19}$, and $Ba_2Me_2Fe_{12}O_{22}$, where Me=Mg, Mn, Fe, Co, Ni, Cu or Zn.

An embodiment of an electrical machine in accordance with the invention is characterized in that the soft-magnetic part is or the soft-magnetic parts are chosen from soft-magnetic material chosen from a set comprising metals, soft-magnetic alloys, soft-magnetic garnets, soft-magnetic spinels, soft-magnetic perovskites and soft-magnetic sulphospinels. Suitable metals are, for example, Fe, Co and Ni. Suitable alloys are, for example, NiP and NiFe. Suitable garnets are, for example, $Y_3Fe_5O_{12}$ and $Gd_3Fe_5O_{12}$. Suitable spinels are, for example, $MeFe_2O_4$, where Me=Fe, Ni, Cu, Mg or Co. Suitable perovskites are, for example $LaMnO_3$ and $LaCoO_3$. Suitable sulphospinels are, for example, $CuCr_2S_4$, $CuCr_2Se_4$, $CuCr_2Fe_4$, and $MnCr_2S_4$.

The invention further relates to a method of fixing intimately a soft-magnetic body and a hard-magnetic body to one another. The soft-magnetic body and the hard-magnetic body may respectively serve as the soft-magnetic part and the hard-magnetic part of the electrical machine in accordance with the invention. The invention consequently also relates to a method of manufacturing an electrical machine in accordance with the invention.

The invention aims at providing a method by of which a soft-magnetic body and a hard-magnetic body can be fixing intimately to one another in such a manner that after they have been fixing intimately there is no or only a minimal magnetic transition resistance at the crossing from one body to the other.

To this end the method in accordance with the invention is characterized in that the soft-magnetic body is provided with a first polished surface and the hard-magnetic body is provided with a second polished surface, after which the two surfaces are moved towards one another and are interconnected to form a composite body by direct bonding. This results in a transition between the two bodies which is free or substantially free from magnetic resistance, which renders the resulting assembly very suitable for magnetic uses.

The invention further relates to a method of fixing intimately two hard-magnetic bodies to one another. The method is characterized in that the two bodies are provided with a polished surface, wherein both polished surfaces are positioned against each other and interconnected to form a composite body by direct bonding. Preferably, the two surfaces are polished in such a manner that a surface roughness having a roughness height smaller than 2 nm is obtained. The resulting composite body has a gap-free or substantially gap-free transition between the two bodies and is therefore very suitable for magnetic uses, such as the electrical machine in accordance with the invention.

In order to ensure that the two surfaces can be spaced at atomic distances from one another, an embodiment of the method in accordance with the invention is characterized in that the surfaces are polished in such a manner that a surface roughness having a roughness height smaller than 2 nm is obtained. Preferably, polishing is effected so as to obtain a maximum roughness height of 0.5 nm. In this respect it is to be noted that the polished surfaces to be bonded should be of similar shape with a high degree of accuracy and in the case of curved surfaces these surfaces should obviously have identical but opposite curvatures.

For an optimum bonding an embodiment of the method in accordance with the invention is characterized in that the two polished surfaces are cleaned and dried before they are placed against one another for direct bonding. Cleaning can be effected, for example, mechanically with the aid of a cleaning liquid. Drying can be effected, for example, by means of filtered air or by centrifuging.

A practical embodiment of the method in accordance with the invention is characterized in that for forming the polished surfaces the two bodies are polished with a colloidal solution of silicon oxide particles in a hydroxide, in particular KOH or NaOH, said particles having a grain size in the nanometer range.

An embodiment which is of particular importance for polishing a hard-magnetic body, is characterized in that said colloidal solution is renewed at least one time in a final polishing stage. Thus, after polishing the polished surface is found to be entirely free of magnetic particles abraded during polishing, despite the presence of magnetic fields.

The method in accordance with the invention is very suitable for fixing intimately to one another a body made of a soft-magnetic material of a set comprising metals, soft-magnetic alloys, soft-magnetic garnets, soft-magnetic spinels, soft-magnetic perovskites and soft-magnetic sulphospinels, and a body made of a hard-magnetic material of a set comprising hard-magnetic intermetallic compounds and hard-magnetic hexagonal ferrites. Moreover, the method is very suitable for fixing intimately to one another two bodies which each comprise a hard-magnetic material of the set comprising hard-magnetic intermetallic compounds and hard-magnetic hexagonal ferrites.

Suitable metals are, for example, Fe, Co and Ni. Suitable soft-magnetic alloys are, for example, NiP and NiFe. Suitable soft-magnetic garnets are, for example, $Y_3Fe_5O_{12}$ and $Gd_3Fe_5O_{12}$. Suitable soft-magnetic spinels are, for example, $MeFe_2O_4$, where Me=Fe, Ni, Cu, Mg or Co. Suitable soft-magnetic perovskites are, for example, $LaMnO_3$ and LaCoO$_3$. Suitable soft-magnetic sulphospinels are, for example, CuCr$_2$S$_4$, CuCr$_2$Se$_4$, CuCr$_2$Fe$_4$ and MnCr$_2$S$_4$. Suitable hard-magnetic intermetallic compounds are, for example, SmCo$_5$, Sm$_2$Co$_{17}$ and Nd$_2$Fe$_{14}$B. Suitable hard-magnetic hexagonal ferrites are, for example, BaFe$_{12}$O$_{19}$ and Ba$_2$Me$_2$Fe$_{12}$O$_{22}$, where Me=Mg, Mn, Co, Ni, Cu or Zn.

An embodiment which is particularly suitable for use with ceramic hard-magnetic materials which are corrosive and/or have comparatively large grain boundaries, is characterized in that at least one of said bodies is provided with a layer of a soft-magnetic material, on which layer the relevant polished surface is formed. Preferably, the soft-magnetic material takes the form of a layer applied by vacuum-deposition or sputtering. It has been found that the soft-magnetic material NiFeCr is particularly suitable because this material can be readily vacuum-deposited, adheres well, and is of dense composition.

BRIEF DESCRIPTION OF THE DRAWINGS

The invention will now be described in more detail, by way of example, with reference to the drawings, in which.

DETAILED DESCRIPTION OF THE PREFERRED EMBODIMENTS

Figure 1:
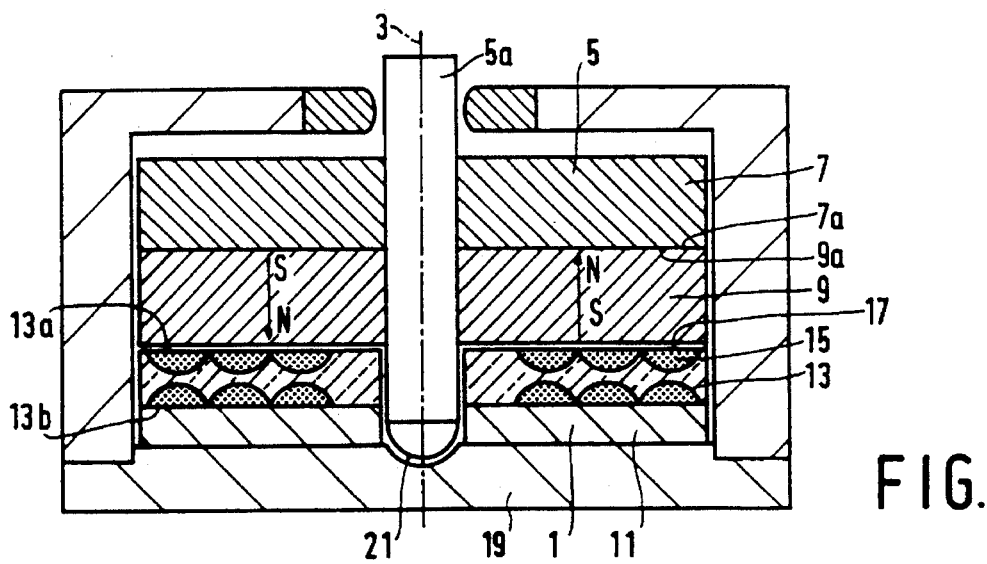
FIG. 1 shows diagrammatically a first embodiment of the electrical machine in accordance with the invention.

The electrical machine in accordance with the invention shown in FIG. 1 is constructed as an electric motor comprising a stationary first section or stator 1 and a second section or rotor 5, which is rotatable about an axis of rotation 3. The rotor 5 has a rotor shaft 5a carrying a disc-shaped soft-magnetic part 7, made of for example NiFe, and a disc-shaped hard-magnetic part 9, made of for example Sm$_2$Co$_{17}$. At their facing surfaces 7a and 9a the two magnetic parts 7 and 9 are fixed intimately to each other by direct bonding.

Figure 4:
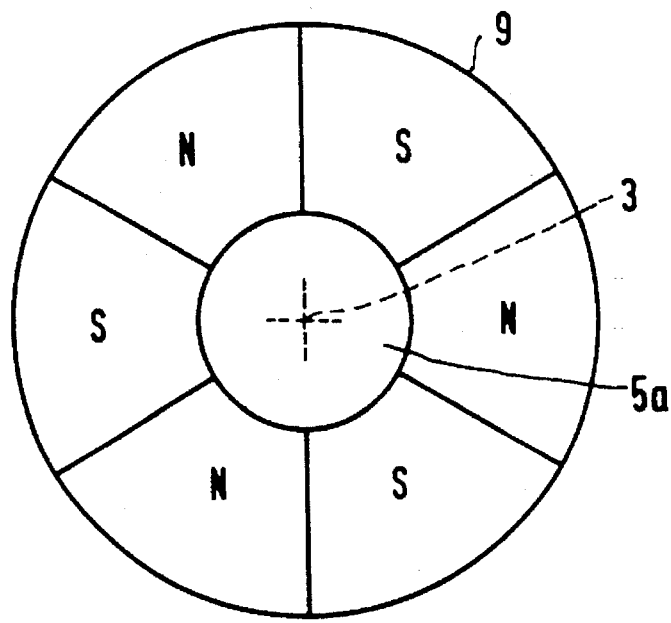
FIG. 4 shows a possible magnetization pattern of a hard-magnetic part of the electrical machine shown in FIG. 1.

FIG. 4 is a plan view showing a possible magnetization pattern for the hard-magnetic rotor part 9. North poles are referenced N and south poles are referenced S.

The stator 1 has a disc-shaped base 11, made of a soft-magnetic material, for example Mn$_{0.45}$Zn$_{0.55}$Fe$_2$O$_4$, carrying a disc-shaped non-magnetic support 13 of, for example, glass or a ceramic material. In the support 13 a plurality of, in the present example six, coils 15 are arranged. An air gap 17 extends between the hard-magnetic part 9 of the rotor 5 and the support 13 of the stator 1. The stator 1 is secured in a stator frame 19, in which a bearing means 21, preferably a spiral-groove bearing, for the rotor shaft 5a is situated.

Figure 5:
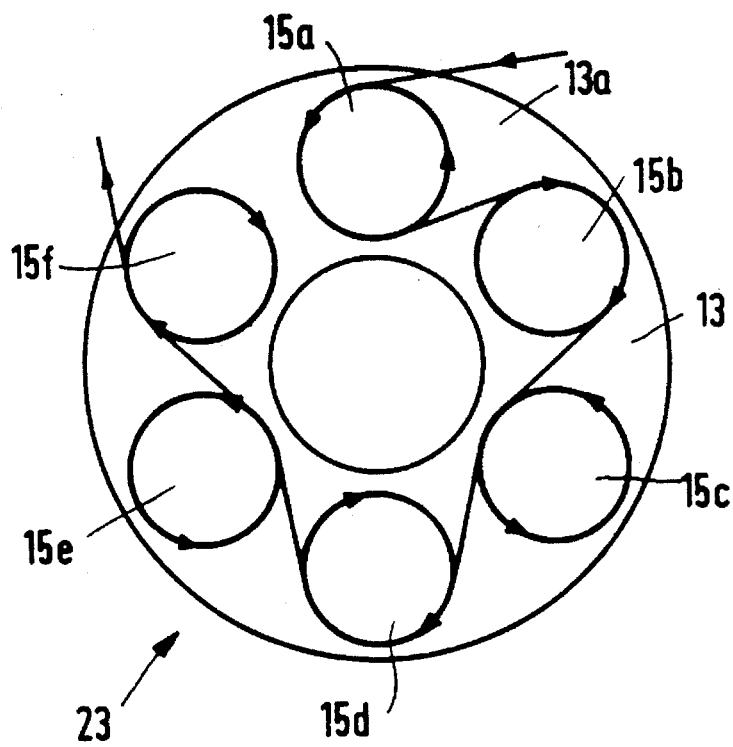
FIG. 5 shows a possible coil pattern of the electrical machine shown in FIG. 1.

FIG. 5 shows a possible coil pattern 23. The coils, bearing the references 15a to 15f in FIG. 5, are preferably embedded in the support 13. The assembly comprising the support 13 and the coils 15 can be manufactured by techniques which are known per se, for example etching in combination with electroplating. In order to enable a narrow air gap 17 to be obtained the main surface 13a of the support 13, which surface adjoins the air gap, should be accurately planar. If desired, the support 13 may be fixed intimately to the base 11 by direct bonding.

Figure 2:
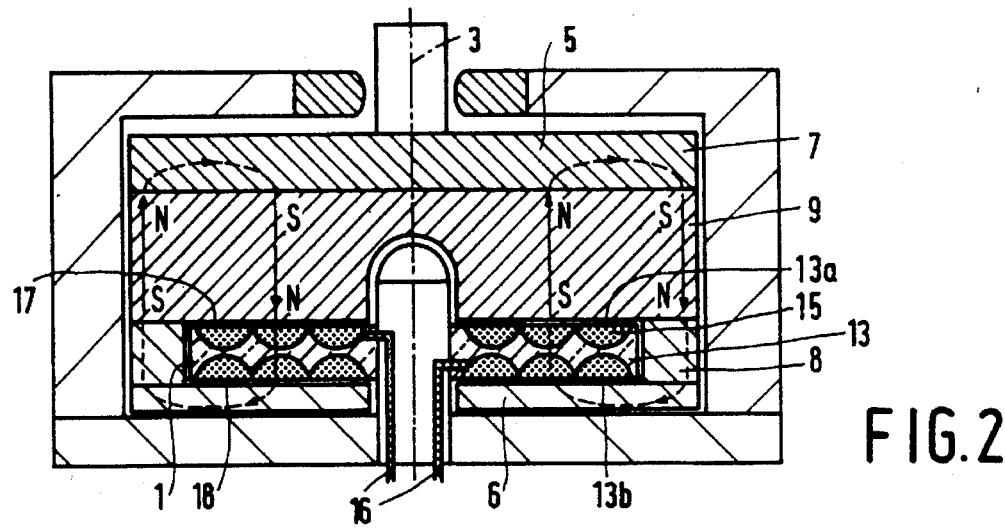
FIG. 2 shows diagrammatically a second embodiment of the electrical machine in accordance with the invention.
Figure 3:
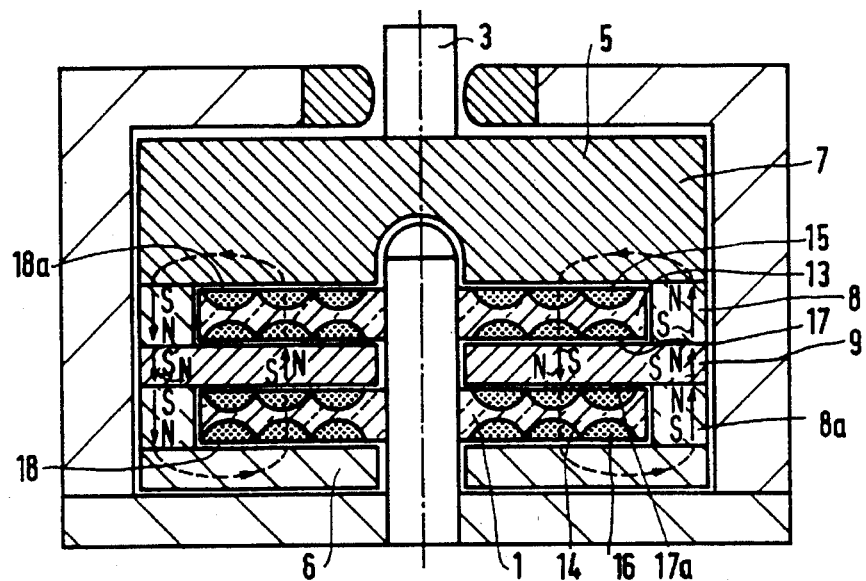
FIG. 3 shows diagrammatically a third embodiment of the electrical machine in accordance with the invention.

A detailed description of the embodiments shown in FIGS. 2 and 3 are given below. Since the embodiments to be described bear much resemblance to the electrical machine shown in FIG. 1 corresponding parts will be given the same reference numerals.

The embodiment shown in FIG. 2 comprises a stationary section 1 and a section 5 which is rotatable about an axis of rotation 3. The stationary section 1 has a non-magnetic support 13 with embedded coils 15, which can be connected to a voltage source via electrical conductors 16. The support 13 has two main surfaces, of which a main surface 13a adjoins a radial air gap 17 and another main surface 13b adjoins a further axial air gap 18.

The rotatable section 5 has a soft-magnetic part 7, made of for example Mn$_{0.45}$Zn$_{0.55}$Fe$_2$O$_4$, a hard-magnetic part 9 adjoining the air gap 17 and made of, for example, SmCo$_5$, a further soft-magnetic part 6 adjoining the air gap 18 and made of, for example Mn$_{0.45}$Zn$_{0.55}$Fe$_2$O$_4$, and an annular flux guide 8 made of a soft-magnetic material, for example Mn$_{0.45}$Zn$_{0.55}$Fe$_2$O$_4$, and interconnecting the parts 6 and 7. The flux guide 8 closes the magnetic circuit of the electrical machine at the outer circumference of the rotatable section 5. The flux guide also serves for magnetically shielding the rotatable section. Instead of a soft-magnetic flux guide it is also possible to use a flux guide 8 of a hard-magnetic material, for example SmCo$_5$. Such a flux guide intensifies the magnetic flux through the magnetic circuit of the motor.

One of the features of the electrical machine shown in FIG. 2 is that at least the facing surfaces of a pair of hard-magnetic and soft-magnetic parts and/or of a pair of hard-magnetic parts are fixed intimately to one another by direct bonding. However, preferably all the facing surfaces of the various magnetic parts 5, 6, 7 and 8 are fixed intimately to one another by direct bonding. This enables the magnetic resistance in the magnetic circuit of this motor to be minimized. Another feature is that the lines of flux of the magnetic field of the motor are partly linked via the outer circumference of the rotatable section 5. This enables eddy-current losses to be minimized because all the soft-magnetic parts belonging to the magnetic yoke form part of the rotatable section.

FIG. 3 shows a further embodiment of the electrical machine in accordance with the invention. The electrical machine comprises a stationary first section 1 and a second section 5 which is rotatable relative to said first section. The first section 1 comprises a non-magnetic support 13 with the coils 15 and a further support 14 with the coils 16, which further support extends parallel to the non-magnetic support 13. The second section 5 comprises a hard-magnetic part 9, which extends between the two supports 13 and 14 and which forms air gaps 17 and 17a with the respective supports. The second section 5 further comprises a soft-magnetic part 7, which forms an air gap 18a with the support 13, and a soft-magnetic part 6, which forms an air gap 18 with the support 14. Both supports 13 and 14 are surrounded with annular hard-magnetic flux guides 8 and 8a respectively, which extend between the hard-magnetic part 9 and the soft-magnetic 7 and between the soft-magnetic part 6 and the hard-magnetic part 9 respectively. Instead of hard-magnetic flux guides it is possible to use soft-magnetic flux guides. In the present embodiment the various magnetic parts 6, 7, 8, 8a and 9 are fixed intimately to one another by direct bonding. This embodiment has special features and advantages similar to those of the electrical machine shown in FIG. 2.

The manufacture of an electrical machine in accordance with the invention requires a specific method. This method comprises the fixing intimately of a hard-magnetic body to a soft-magnetic body, or the fixing intimately of a first hard-magnetic body to a second hard-magnetic body, the bodies in both cases being provided with a polished surface, after which the two polished surfaces are placed against each other and are interconnected by direct bonding. For an optimum bonding process and, consequently, a strong bond between said magnetic bodies the present method, which falls within the scope of the invention, ensures that the polished surfaces are highly smooth and are shaped to engage accurately against or with one another, the polished surfaces have a surface roughness with a roughness height smaller than 2 nm but preferably smaller than 0.5 nm, and the polished surfaces are thoroughly cleaned and dried just before bonding.

Moreover, it is found to be important to effect bonding fairly soon after completion of the polishing process. In accordance with the invention a suitably polished surface of a body of a soft-magnetic material can be obtained by first grinding and subsequently polishing the surface, using a colloidal solution of silicon oxide particles in a KOH or NaOH solution, the silicon oxide particles having a grain size in the nanometer range. Said hydroxides preferably have a pH of approximately 10.3. After polishing the surface thus formed is cleaned, for example by means of a brush with the addition of deionised water. Finally the surface is dried, for example by means of filtered air.

A similar method can be employed in order to obtain a suitably polished surface of a body of a hard-magnetic material, such as $Sm_2Co_{17}$. However, surprisingly it has been found that it is necessary to provide a hard-magnetic body in its magnetized state with a polished surface suitable for direct bonding. This is because the surface structure of a polished surface of a non-magnetized hard-magnetic material changes slightly during magnetization. This means that additional steps must be taken in view of the magnetic field existing around a permanently magnetized body. First of all, the grinding and polishing tool should be free of soft-magnetic parts to preclude a magnetic interaction with the hard-magnetic body. Moreover, it is necessary to renew the colloidal solution of silicon oxide particles in a hydroxide one or several times in a final polishing stage. Surprisingly, it has been found that in this way the magnetic particles produced by grinding and polishing can be removed from the magnetic surface without any problems, presumably because these particles are encapsulated in the colloidal solution.

In accordance with the invention two hard-magnetic bodies or one hard-magnetic and one soft-magnetic body can be interconnected by direct bonding after the polished surfaces have been formed as described above.

Experiments have shown that in combinations of a hard-magnetic body and a soft-magnetic body of a ceramic material with comparatively large grain boundaries the polished surface of the soft-magnetic body is roughened as it approaches the hard-magnetic body. A magnetic action exerted by the hard-magnetic material on magnetic crystallites in the grain boundaries of the soft-magnetic material has the effect that the crystallites are slightly extended. This effect may adversely affect the bonding process. Said effect can be mitigated by providing one or both polished surfaces with a layer of a soft-magnetic material. A very suitable soft-magnetic material is an NiFeCr compound because this material can be readily vacuum-deposited, adheres well to a hard-magnetic or soft-magnetic surface, and is of dense composition.

It is to be noted that the invention is not limited to the embodiments shown in the drawings.

We claim:

1. An electrical machine comprising a first section and a second section which is movable relative to the first section, at least one of said sections comprising a soft-magnetic part and a hard-magnetic part, which parts are interconnected, characterized in that:

a surface of the soft-magnetic part and a surface of the hard-magnetic part, each having a surface roughness height of about less than or equal to two nanometers, are fixed intimately to one another such that a direct bond is formed without requiring an additional bonding material disposed between the surfaces of the two magnetic parts.

2. An electrical machine as claimed in claim 1, wherein the second section is a rotor rotatable about an axis of rotation and is axially spaced from the first section by a gap, and the bonded surfaces of the soft-magnetic and hard-magnetic parts extend in a plane oriented transversely to the axis of rotation.

3. An electrical machine as claimed in claim 2, further comprising a non-magnetic support having a main surface adjoining the gap, wherein one of the sections comprises the soft-magnetic part and the hard-magnetic part, and the other section comprises a coil embedded in the non-magnetic support.

4. An electrical machine as claimed in claim 3, characterized in that parallel to said main surface the support has a further main surface adjoining a further gap formed between the first section and the second section, a further magnetic support faces the other main surface of the support, and a magnetic flux guide circumferentially surrounds the support and extends axially between and is connected to the hard-magnetic part facing one of said main surfaces of the support and the further soft-magnetic part which faces the other main surface of the support.

5. An electrical machine as claimed in claim 3, further comprising a further support which extends parallel to said support and which comprises a coil, a further soft-magnetic part parallel to said soft-magnetic part the hard-magnetic part extending between the two supports and forming a gap with each of the supports, one of said supports forming a gap with the soft-magnetic part and the other support forms a gap with the further soft-magnetic part parallel to said soft-magnetic part, and a pair of annular magnetic flux guides each circumferentially surrounding a respective said support and extending between the hard-magnetic part connected to the relevant flux guide and one of said soft-magnetic parts which is connected to the relevant flux guide and one of said soft-magnetic parts which is connected to the relevant flux guide.

6. An electrical machine as claimed in claim 4, characterized in that each of the flux guides is permanently magnetized.

7. An electrical machine as claimed in claim 6, characterized in that one surface of each of the flux guides is connected to a surface of one of the soft-magnetic parts by a direct bond.

8. An electrical machine as claimed in claim 6, characterized in that one surface of each of the flux guides is connected to a surface of one of the hard-magnetic part by a direct bond.

9. An electrical machine comprising a first section and a second section which is movable relative to the first section, characterized in that: at least one of said first and second sections comprises two hard-magnetic parts, a surface of one hard-magnetic part having a surface roughness height of about less than or equal to two nanometers and being fixed intimately to a surface of the other hard-magnetic part also having a surface roughness height of about less than or equal to two nanometers such that a direct bond is formed between the two fixed surfaces without requiring an additional bonding material disposed between the fixed surfaces of the hard magnetic parts.

10. An electrical machine as claimed in claim 1, characterized in that each of the hard-magnetic parts and each of the soft-magnetic parts comprise a hard-magnetic material of one of hard-magnetic intermetallic compounds and hard-magnetic hexagonal ferrites.

11. An electrical machine as claimed in claim 1, characterized in that each of the soft-magnetic parts comprises soft-magnetic material one of which is selected from a group consisting essentially of metals, soft-magnetic alloys, soft-magnetic garnets, soft-magnetic spinels, soft-magnetic perovskites and soft-magnetic sulphospinels.

12. An electrical machine as claimed in claim 5, wherein each of the flux guides is permanently magnetized.

13. An electrical machine as claimed in claim 12, wherein one surface of each of the flux guides is connected to a surface of one of the soft-magnetic parts by said direct bond.

14. An electrical machine as claimed in claim 5, characterized in that one surface of each of the flux guides is connected to a surface of one of the hard-magnetic parts by said direct bond.

15. An electrical machine as claimed in claim 9, characterized in that each of the hard-magnetic parts and each of the soft-magnetic parts comprise a hard-magnetic material of one of hard-magnetic intermetallic compounds and hard-magnetic hexagonal ferrites.

16. An electrical machine as claimed in claim 1, wherein said direct bonded surfaces each have a surface roughness having a surface height of less than 0.5 nm.

17. An electrical machine according to claim 1, wherein said hard magnetic part includes a layer of soft magnetic material at its surface which is direct bonded to said soft magnetic part.

18. An electrical machine according to claim 17, wherein the hard magnetic part comprises a ceramic.

19. An electrical machine according to claim 18, wherein said layer of soft magnetic material comprises NiFeCr.

20. An electrical machine having a first magnetic part and a second magnetic part fixed to said first magnetic part at opposing surfaces thereof, wherein the improvement comprises:

said opposing surfaces each having a surface roughness height of about less than or equal to two nanometers such that said magnetic parts are fixed to each other solely by a direct bond between said opposing surfaces without requiring an additional bonding material disposed between the opposing surfaces of said magnetic parts.

21. An electric motor, comprising:

a) a stator having first and second main surfaces; and b) a rotor rotatable with respect to said stator about an axis of rotation, said stator comprising a first magnetic part spaced opposite said first main surface of said stator, a second magnetic part spaced opposite said second main surface of said stator, and an annular flux guide circumferentially surrounding said stator and fixed to each of said first and second magnetic parts by a direct bond therebetween, the first and second magnetic parts and the annular flux guide being selected such that during operation the lines of flux of the magnetic field of the motor form a flux circuit extending axially along the periphery of the first magnetic part, through the direct bond between the first magnetic part and the flux guide, through the flux guide and the direct bond between the flux guide and the second magnetic part, through the second magnetic part and the space between the second magnetic part and the stator, and through the stator, the space between the stator and the first magnetic part and back into the first magnetic part to its periphery.

* * * * *